United States Patent
Rantanen

(10) Patent No.: US 8,966,189 B2
(45) Date of Patent: Feb. 24, 2015

(54) MANAGING INTEGRITY OF SHARED DATA IN A MANNER PERMITTING DELAYED UPDATES

(75) Inventor: Teemu Rantanen, Helsinki (FI)

(73) Assignee: Tekla Corporation, Espoo (FI)

(*) Notice: Subject to any disclaimer, the term of this patent is extended or adjusted under 35 U.S.C. 154(b) by 220 days.

(21) Appl. No.: 13/421,896

(22) Filed: Mar. 16, 2012

(65) Prior Publication Data

US 2012/0239886 A1  Sep. 20, 2012

Related U.S. Application Data

(60) Provisional application No. 61/466,171, filed on Mar. 22, 2011.

(30) Foreign Application Priority Data

Mar. 18, 2011 (FI) ........................................ 20115269

(51) Int. Cl.
*G06F 12/00* (2006.01)
*G06F 17/30* (2006.01)

(52) U.S. Cl.
CPC .... *G06F 17/30368* (2013.01); *G06F 17/30578* (2013.01)
USPC ................................. 711/147; 711/E12.001

(58) Field of Classification Search
CPC .............................. G06F 13/1663; G06F 9/544
USPC ......................................... 711/147, E12.001
See application file for complete search history.

(56) References Cited

U.S. PATENT DOCUMENTS

| RE38,457 E | 3/2004 | Rothrock et al. |
| 7,418,544 B2 * | 8/2008 | Mukherjee et al. ........... 711/111 |
| 7,822,711 B1 | 10/2010 | Ranade |

OTHER PUBLICATIONS

Finnish Search Report, dated Feb. 10, 2012, from corresponding Finnish application.
Kevin Miller et al., "Synchronization of Mobile XML Databases by Utilizing Deferred Views", Julkaisusa Proceedings of the 2004 IEEE International Conference on Information Reuse and Integration, Nov. 8-10, 2004, pp. 186-191, Retrieved from the Internet: URL: http://ieeexplore.ieee.org/stamp/stamp.jsp?tp=&arnumber=1431458&isnumber=30875; Cited in Finnish Search Report.
Bernstein et al., "Concurrency Control in Distributed Database Systems", Computing Surveys, 1981, vol. 13, No. 2, pp. 185-221.
Cederqvist et al., "Version Management with CVS", Concurrent Versions Systems v1.11.3, Announcement Signum Support, XX, 1993, pp. 1-173, XP002299212.
Phatak et al., "Multiversion Reconciliation for Mobile Databases", Data Engineering, 1999, Proceedings, 15th International Conference on Sydney, IEEE Comput, pp. 582-589, XP010326173.
Extended European Search Report, dated Jan. 21, 2014, from corresponding EP application.

* cited by examiner

*Primary Examiner* — Jasmine Song
(74) *Attorney, Agent, or Firm* — Young & Thompson

(57) ABSTRACT

To provide delayed updating of shared data, a concept of dualistic sequence information is introduced. In the concept, if during local modification of data, a modification to the data is published by another user, a local deviation is created, and when the modification is published, it is associated with an unambiguous sequence reference and the local deviation.

20 Claims, 6 Drawing Sheets

MANAGING INTEGRITY OF SHARED DATA IN A MANNER PERMITTING DELAYED UPDATES

FIELD

The invention relates to data processing and particularly to processing shared data that may be updated.

BACKGROUND

Computer based structured storage systems, such as computer file systems and database systems, have been remarkably successful at providing users with quick and facile access to enormous amounts of data. At the same time data management systems have been evolved for handling shared or concurrent access and update of data in a server by different clients. Typically in such a multi-user environment, data can be accessed freely but updating the data is usually tied to its "access time" or updating time in a server. For example, if one user has opened a document and is editing it, the document is locked for editing and other users can open the document but cannot update the document to the server. Another example is flight booking; the first travel agency to book a free seat obtains it; others obtain information that the amount of free seats has been decreased.

Evolvement of cloud computing has also introduced different documentsharing services. An example of such a service is Google Docs by means of which documents can be shared, opened, and edited by multiple users at the same time when the users are online so that each modification is instantly shown to all users, i.e. a user can collaborate in real-time with other users. Google Docs used to have an offline support but the feature was withdrawn; most probably there were problems with how to provide collaboration between online users and offline users. Thus, currently Google Docs requires real-time online connection for it to be used. Google has announced to deliver in 2011 an improved offline feature that takes advantage of advancements in modern browser technology, like HTML5. However, more detailed information about how modifications made offline are handled is not available at the time of the invention.

Yet a further example relates to a modeling application, in which a model is stored in a shared memory as a file comprising one or more data items. When a user retrieves the model from the shared memory, the user receives a copy of the file into his/her local memory. Each time the copy, or a modified copy, is stored back into the shared memory, the file in the shared memory is locked so that other users cannot access it, the current file on the shared memory is read by the modeling application into the user's computer so that updates to the file made by other users while the copy was only on the user's computer can be taken into account and possible conflicts can be resolved by the user. Then the modeling application updates the whole file to propagate modifications to all objects in the file, for example to update a drawing relating to a beam when a height of the beam has been modified, and stores the updated file in the shared memory. Only after the storing has ended is the lock released so that other users can access the file. One problem associated with the solution is that it uses the computing resources inefficiently by, for example, updating information, such as the drawing, which may be updated several times, for example because the height of the beam is modified several times, before the information is actually needed, i.e. before the drawing is used.

SUMMARY

The invention relates to methods, an apparatus, a computer program product and a system which are characterized by what is stated in the independent claims. Preferred embodiments are disclosed in the dependent claims.

An aspect provides a dualistic sequence including an unambiguous sequence and information indicating a possible internal (local) deviation from the unambiguous sequence. The unambiguous sequence indicates a storing (publishing) order in a shared memory, the shared memory being a memory in which shared data is stored so that it is accessible to two or more users for retrieving local copies of data items in the shared data (including published modifications to the shared data), the unambiguous sequence being a global sequence for the shared data in the shared memory, i.e. the global sequence being global at the shared memory level. An internal sequence may differ from the global sequence, if, for example, during local editing of an object N in an apparatus Z and before storing an editing result A into the shared memory, someone else has stored an editing result B into the shared memory. Locally, i.e. in the example in the apparatus Z, the result B is newer compared with the local editing of the object N performed before the result B was retrieved from the shared memory, but globally in the shared memory the result B will be older for the later published local editing of the object N in the apparatus Z. The dualistic sequence, created with the editing, indicates this deviation from the global sequence by means of the deviation information, and therefore the deviation is detectable later.

An advantage provided by the dualistic sequence is that it enables updating of information to be postponed.

BRIEF DESCRIPTION OF THE DRAWINGS

In the following different embodiments will be described in greater detail with reference to the attached drawings, in which.

DETAILED DESCRIPTION OF SOME EMBODIMENTS

Figure 1:
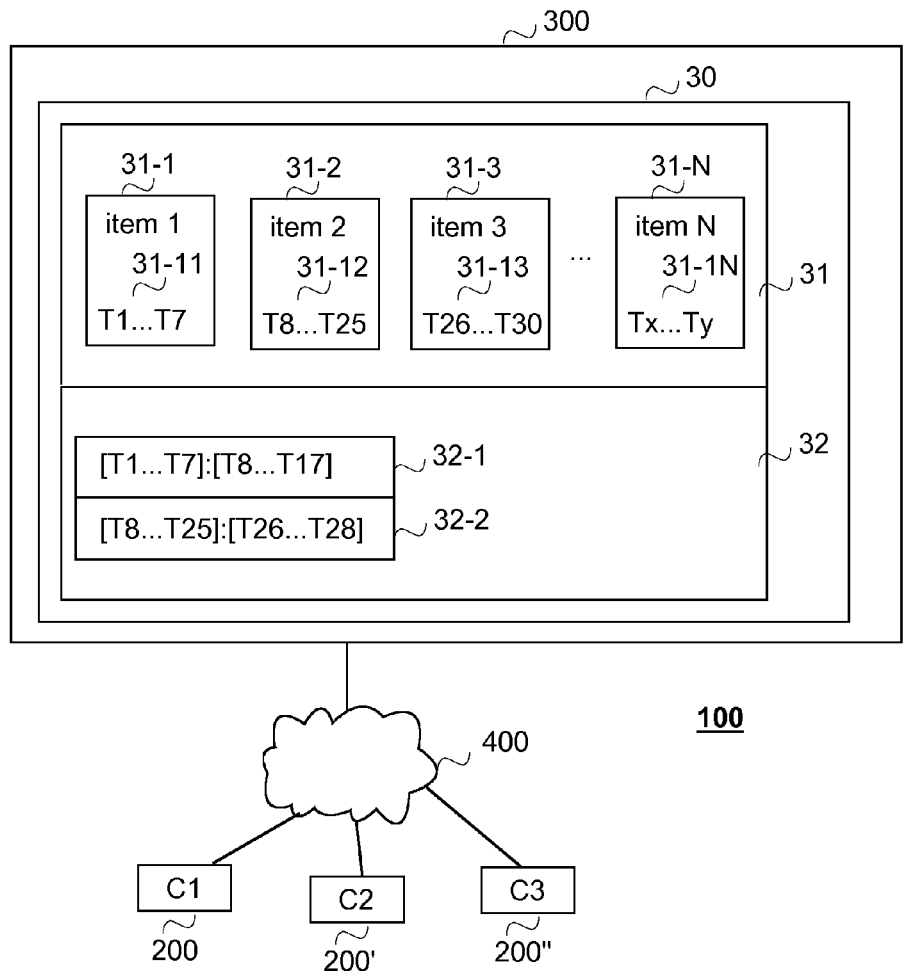
FIG. 1 is a simplified block diagram illustrating a system used as an example.

Exemplary embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any application supporting use of shared data, any computing apparatus and corresponding component(s) configured to access and update/modify shared data stored on a shared data repository (memory), in any data storage system or any combination of different data storage systems, such as data repositories (memories) in a client-server structure. The data repository may be an external data repository shared by different user apparatus, and/or the data repository may be an internal memory of a computing apparatus shared by different applications or different application instances. The methods and processes used by the computing apparatuses, by different data managing systems, including file systems, and data repositories, are developing. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, and architecture based on a client-server structure and data sharing based on a "copy—modify locally" solution, without restricting the embodiments to such an architecture, however. It should be appreciated that herein the client-server structure also covers applications and/or application instances acting as the client and the common memory with its control system performing the server functionality required for that specific implementation. In addition, it should be appreciated that herein a modification also covers creating and/or deleting. Further, in the following, time is used as one example of a reference to indicate a sequence (order) without restricting the examples to the time; any other means/reference to indicate a sequence can be used, such as an unambiguous storing index. Other examples are given below. It should be appreciated that herein a "sequence" means the particular order in which events or actions happened. Using the time as an example, the sequence reference may be determined by an ending time of an event/action, and/or by a time period relating to an event/action, and/or by a timestamp of an event/action, and/or by a place of an event/action in a line/list/queue/string, and/or by references/backtracks, etc., and "newer" means later than "older" in time, i.e. "older" precedes "newer" in time. In other words, an unambiguous sequence (order) may be used as a reference order for deviation information to be shared between more than one parties.

A general architecture according to an embodiment is illustrated in FIG. 1. FIG. 1 is a highly simplified system architecture only showing some elements, networks and functional entities, all being logical units whose implementation may differ from what is shown. The connections shown in FIG. 1 are examples of logical connections; the actual physical connections may be different. It is apparent to a person skilled in the art that the systems also comprise other functions and structures. It should be appreciated that the functions, structures, elements and the protocols used in or for data accessing, updating and management are irrelevant to the actual invention. Therefore, they need not be discussed in more detail here.

The system 100 illustrated in FIG. 1 comprises one or more apparatuses 200, 200', 200" as clients, connected to a server system 300 over a network 400. Examples of the network 400 include a mobile network, a public switched telephone network, a wide area network WAN, Internet, a local area network LAN open for all users or with restricted access (an enterprise LAN or office LAN, for example), or a private network. Yet a further example is a computer forming a "system" for internal clients, such as applications and application instances, in which case an internal bus, like a memory bus, acts as a "network".

Figure 2:
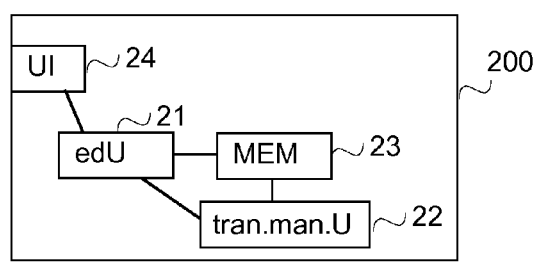
FIG. 2 is a schematic block diagram of an exemplary apparatus.

The apparatus 200, described in more detail with FIG. 2, may be any computing apparatus with which shared data can be accessed, created, obtained/retrieved/downloaded, modified, deleted, updated and/or published. Examples of apparatuses include a user terminal or work station, such as a laptop, a smartphone, a personal computer, a tablet computer, a field device, an e-reading device, a printer with processing capabilities, or a personal digital assistant (PDA).

In the embodiment of FIG. 1, the server system 300 comprises a data repository managed by a file management system or a database management system, for example, and accessible over the network 400 by the clients 200, 200', 200" having proper access rights. The management system stores contents, allowing data creation, deletion, update, maintenance and search, and may provide access, security, backup and other facilities, such as monitoring modifications to data and downloading modifications to relevant clients (or applications or application instances in client apparatuses).

The data repository may be any kind of conventional or future data repository, including distributed and centralized storage of data, managed by any suitable management system. An example of distributed storage includes a cloud storage in a cloud environment (which may be a public cloud, a community cloud, a private cloud, or a hybrid cloud, for example). The implementation of the data repository and the way in which the shared data is stored and updated bear no significance to the invention, and need not be described in detail here. In the exemplary system, data are stored in the repository in a file, for instance.

In the illustrated example, a data repository 30 contains one file 31 representing shared data and deviation information 32 associated with the file. It should be appreciated that the deviation information 32 may be part of the file or even part of a data item. In the illustrated example, the file 31 comprises data items 31-1, 31-2, 31-3, . . . 31-N, each data item comprising, in addition to its actual contents (not shown in FIG. 1), a time period 31-11, 31-12, 31-13, 31-1N indicating the unambiguous sequence of the data item in the data repository. For the sake of clarity, below the term "global sequence" is used for the unambiguous sequence of shared data. Thus, each time period illustrates a global sequence reference. The global sequence reference may be given by means of globally unique identifiers (GUIDs). A GUID is a special type of identifier used in software applications to provide a unique reference number or reference time.

Depending on an implementation, the data items may or may not contain overlapping information and/or information only on modifications performed and/or information on one data item may contain information depending on information on another data item, as will be described in more detail below. Further, the data items may be updated versions of the same data. Herein a data item means a set of logically related data treated as a unit. It should be appreciated that it depends on the application used what may constitute a data item. For example, there may be a separate data item for a model of a beam and a separate data item for a drawing of the beam, or they may be in the same data item. However, the data item itself, or information stored therein, bears no significance; the invention may be utilized with any kind of data and file format, etc., as long as the data is associated, in addition to the global sequence (reference(s)), with the deviation information 32 to provide the dualistic sequence information, i.e. dualistic order information. Herein, dualism refers to the variations of order of changes in unambiguous sequence as a result of concurrent changes being combined, when having more than one order, resulting dualistic sequence information. Dualistic sequence information gives information about the orders of published items. There is more than one possible order for the items. The dualistic sequence information may be generated as will be described in connection with FIGS. 3, 5, and 7, and it should be appreciated that FIG. 1 shows only an example of how and in which format to store the deviation information and the global sequence reference(s). Any other ways of storing corresponding information may be used. By means of having the dualistic sequence information and sharing it with other users, a deviation from the global sequence is made traceable/visible to others, and it enables updating of information to be postponed to a point at which the information is needed thereby reducing the load of computing apparatuses.

In the illustrated example, the deviation information contains two data fields: a data field 32-2 indicating one local change of order to the global sequence, and a data field 32-1 indicating another local change of order to the global sequence. A data field holds a single fact: in the illustrated example, the time period before the colon illustrates globally older time and the time period after the colon illustrates time periods relating to globally newer time periods which indicates that a globally older time may be locally newer, and they are obtained and used as will be explained in detail below. If there is no deviation information, depending on an implementation, either no data field is stored or a data field indicating that there are no deviations to the global sequence is stored. It should be appreciated that instead of data fields, data records, each comprising a set of dualistic sequence information or mere deviation information of a specific data item, may be used as well. However, below the term deviation data field is used to mean the deviation information regardless of the form in which the deviation information is stored, and the term "local deviation" is used to mean the deviation information.

Although in the example of FIG. 1 only a couple of data items and deviation data fields are illustrated, it should be appreciated that there may be any amount of data items and/or deviation data fields in the shared data. Further, it should be appreciated that the data items may be files which may be associated with each other, such as belonging to the same project, etc., and/or have any data structure or data format which may be different from the structure or format of others.

The server system 300 may be one server node, or a corresponding computing apparatus, comprising processor(s) and memory for the management systems and for the data repository, or different modules and/or memory of the server system may be implemented in two or more physical or logical entities. For example, the data repository 30 and the server system 300 may be distributed between two or more of the clients 200, 200', 200". The server system 300 may even be an internal system within a computing apparatus, for example, when data sharing is between applications that run in the computing apparatus.

FIG. 2 illustrates an exemplary block diagram of an apparatus providing a client functionality. For the sake of clarity the apparatus, or a corresponding component, is herein called a client. The client 200 is a computing device comprising not only prior art means, but also means for implementing a client functionality described with an embodiment, and it may comprise separate means for each separate function, or means may be configured to perform two or more functions, and even to combine functions of different embodiments. These means may be implemented by various techniques. For example, the means may be implemented by hardware (one or more apparatuses), firmware (one or more apparatuses), software (one or more modules), or combinations thereof. For firmware or software, implementation can be through units/modules (e.g., procedures, functions, and so on) that perform the functions described herein.

In other words, the client 200 is configured to perform one or more of client functionalities described below with an embodiment, and it may be configured to perform functionalities from different embodiments. For this purpose, the exemplary client illustrated in FIG. 2 comprises an editing unit (edU) 21, a transaction manager unit (tran.man.U) 22, and at least one memory 23 for storing at least one or more data items as a "run-time database" for the editing unit and for the transaction manager unit.

In the illustrated example, the editing unit 21 is associated with one or more applications with which, when being run, a user can create, delete and/or otherwise modify data, the editing unit 21 being configured to manage different modifications and/or updates to a data item which are received either via a user interface or from the transaction manager unit, and to request the transaction manager unit to obtain requested data item(s) in response to a user request, and to request the transaction manager unit to publish a modified and/or updated data item in response to a user request.

The transaction manager unit 22 is configured to obtain data and/or publications/updates from a data repository automatically (by monitoring the data repository for publications) and/or as a response to a specific request received from the editing unit, generate and maintain the dualistic sequence information for an obtained data item, and to publish data (the whole data or modification information on the data or update information, etc.) into the data repository, depending on an embodiment/implementation, either with or without the dualistic sequence information. If both the data and the dualistic sequence information are to be published, one way to ensure that both of them are stored in the data repository is to use an atomic transaction that ensures that both the data and the dualistic sequence information are stored in the data repository or none of them. It should be appreciated that other kind of transactions may be used. Data publishing, also called committing or storing or uploading, means that data is written to the data repository.

The client also comprises different interface units, like a user interface 24 by means of which a user can create data, modify and/or update data, study it, print data (such as drawings or reports), etc. In addition, the client may comprise a separate interface unit including a transmitter and/or a receiver or a corresponding means for receiving and/or transmitting information.

Each of the units may be a separate unit or integrated to another unit, or the units may be integrated together. It should be appreciated that the client may comprise other units used in or for data processing. However, they are irrelevant to the actual invention and, therefore, they need not to be discussed in more detail here.

The client and corresponding apparatuses implementing a functionality or some functionalities according to an embodiment may generally include a processor (not shown in FIG. 2), controller, control unit, micro-controller, or the like connected to a memory and to various interfaces of the apparatus. Generally the processor is a central processing unit, but the processor may be an additional operation processor. The editing unit 21, and/or the transaction manager unit 22 may be configured as a computer or a processor, or a microprocessor, such as a single-chip computer element, or as a chipset, including at least a memory for providing storage area used for arithmetic operation and an operation processor for executing the arithmetic operation. The editing unit 21, and/or the transaction manager unit 22 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed to carry out one or more functions of one or more embodiments. An embodiment provides a computer program embodied on any client-readable distribution/data storage medium or memory unit(s) or article(s) of manufacture, comprising program instructions executable by one or more processors/computers, which instructions, when loaded into an apparatus, constitute the editing unit and/or the transaction manager unit. Programs, also called program products, including software routines, program snippets constituting "program libraries", applets and macros, can be stored in any medium and may be downloaded into an apparatus. The data storage medium or the memory unit may be implemented within the processor/computer or external to the processor/computer, in which case it can be communicatively coupled to the processor/computer via various means, as is known in the art.

As said above, the client includes memory 23 for acting as a "run-time database". The memory may be volatile and/or non-volatile memory and it may also store other data. For example, the memory may store a computer program code such as software applications (for example, for the editing unit or the data publishing unit) or operating systems, information, data, content, or the like for the processor to perform steps associated with operation of the client in accordance with embodiments. The memory may be, for example, a random access memory, adouble floating-gate field effect transistor, a hard drive, another fixed data memory or storage device or any combination thereof. Further, the memory, or part of it, may be a removable memory detachably connected to the client.

Although the client has been depicted as one unity, different processors, controllers, interfaces and/or memory/memories may be implemented in one or more physical or logical units.

Below, sequence reference periods, or reference groups, are illustrated only using one reference for the sake of clarity. For example, a time period T1 . . . T7 illustrated in FIG. 1 would simply be denoted below as T7 or T1. It should be appreciated that if the implementation attaches, as corresponding global sequence references, only one sequence reference to one data item, the reference denoted below simply means that reference.

Figure 3:
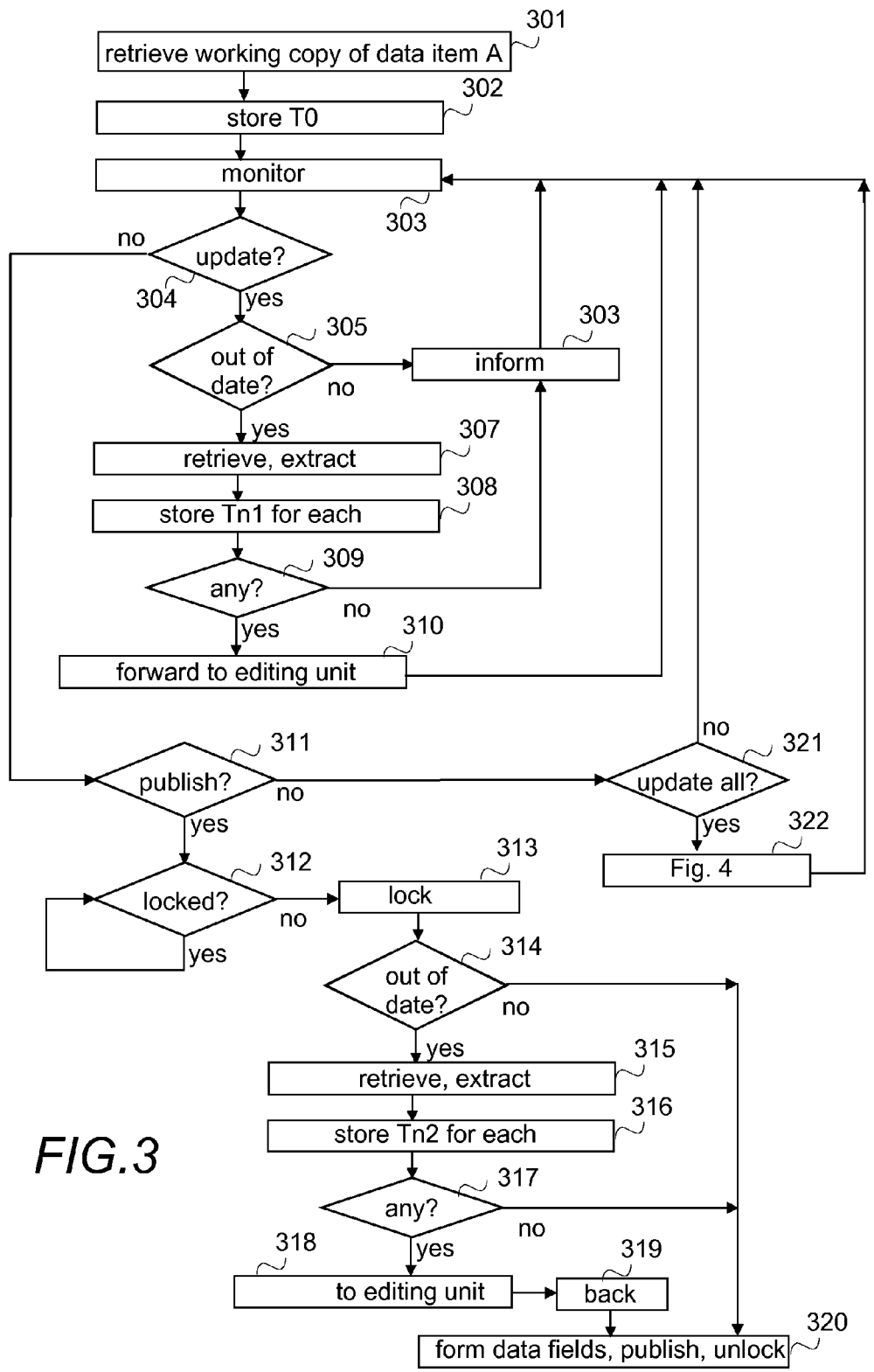
FIGS. 3 to 6 are flow charts illustrating exemplary functionalities of a client according to different examples.
Figure 4:
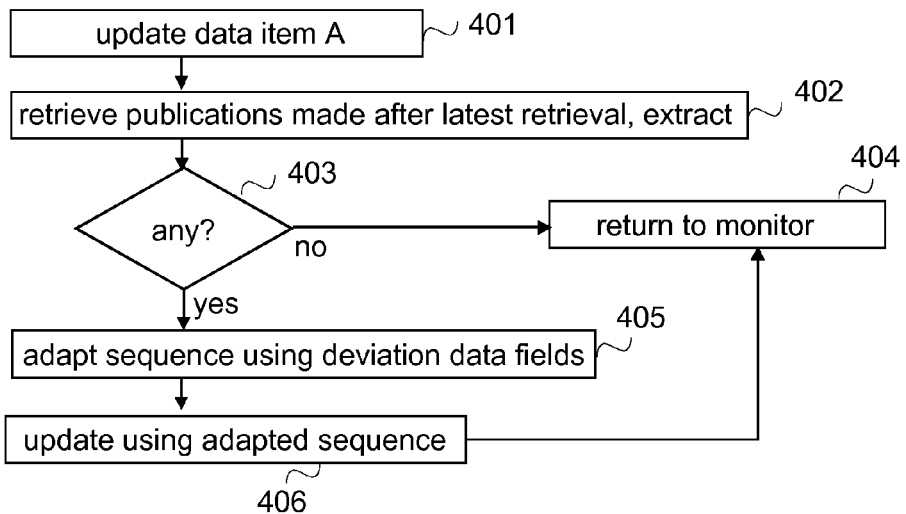

FIGS. 3 and 4 are flow charts illustrating a functionality of a transaction manager unit according to an embodiment. In other words, no internal functions of the editing unit and corresponding applications are illustrated, such internal functions including tracking modifications, storing modifications locally, and conflict handling. In the embodiment it is assumed that an update of an object, caused by an update/modification to another object or a published modification of another user, is delayed until specifically requested or until the object is edited. In the example, it is assumed that the editing unit may send to the transaction manager one of the following instructions: retrieve data, update, publish, and update all. Within the example, following interpretations are given: "Retrieve data" in the embodiment means to retrieve a working copy of object(s), i.e. corresponding data item(s), relating to a user selection (a mouse click on an object's name, objects within a selection window, etc.) "Update" in the embodiment means to retrieve another user's/other users' intermediate publication(s), if any exist(s), and conflict resolve/merge corresponding modifications, if any, an outcome of a possible conflict resolution being stored as modification information. "Publish" means publishing/storing the modified data item(s) and associated global sequence reference(s) and deviation data fields, if any, into the shared memory. "Update all" means that all objects are updated on a specific request.

Further, in the example it is assumed that the publishing time is used as a global sequence reference for the publication, i.e. to the published contents. In the example, the order in which modifications/amendments are in the publication may be used to determine their internal sequence, if necessary.

The user has indicated via the user interface to the editing unit that she/he wishes to modify one or more specific objects in a file, and the editing unit sends a data retrieval request to the transaction manager unit. Therefore, the transaction manager unit obtains, in step 301, a working copy of a corresponding data item A from the repository, the data item A comprising at least definitions and/or configurations relating to the selected (specific) one or more objects. In the example, for the sake of clarity, it is assumed that no update is needed at this stage and that all selected objects in the data item A in the illustrated example have the same global reference time T0. Further, the transaction manager unit stores, in step 302, the time T0 temporarily for possible later use.

Then the transaction manager monitors, in step 303, requests relating to the retrieved data item A. If the computing apparatus is turned off before any request is received, the transaction manager continues the monitoring when the computing apparatus is again turned on.

In the illustrated example, for the sake of clarity, it is assumed that the requests relating to the retrieved data item A may be an update (step 304), publish (step 311) or update all (step 321).

If an update is received (step 304), for example, the user wishes to check whether or not someone else has published modifications relating to the selected one or more objects which are currently edited in the data item A, the transaction manager unit checks, in step 305, whether or not the working copy relating to the selected objects is out of date. In this example, this is performed by obtaining from the data repository a global reference time Tn1 of the latest update for each object n included in the data item A. If each time Tn1 is equal to or older than the time T0, the selected objects are not out of date, the editing unit is informed (step 306) correspondingly, and the transaction manager unit continues monitoring (step 303).

If there is at least one time Tn1 that is newer than the time T0, the working copy relating to the selected objects may be out of date, the transaction manager unit retrieves, in step 307, at a global time T_ret1 working copies of publications made after T0, and extracts modifications relating to the selected objects currently edited. Each time a published modification of a non-selected object in the data item A is discarded, the transaction manager unit stores, in step 308, at least temporarily a corresponding time Tn1. It should be appreciated that when this update is performed next time at T_ret2, T_ret1 is used instead of T0, etc.

If no modifications are left after the extraction (step 309), the selected objects are up to date, and the process proceeds to step 306 to inform the editing unit. If there are modifications (step 309) published to the selected objects currently edited, the transaction manager unit sends, in step 310, the modifications relating to the selected one or more objects currently edited to the editing unit to be merged with the previously obtained working copy (including resolving conflicting or overlapping modifications, such as two different values given to a parameter, one by the user and the other by the other who published the modification at Tn1). However, this is not illustrated in FIG. 3, since in the embodiment the editing unit is configured to perform this while merging. Then the transaction manager unit continues monitoring (step 303).

In the illustrated example, if a publish is received (step 311), the transaction manager unit checks, in step 312, whether or not the shared memory is locked. If locked, the transaction manager unit keeps on the checking (step 312) until the memory is no longer locked. When the memory is free, i.e. unlocked, the transaction manager unit locks, in step 313, the shared memory for storing (either allowing or not allowing reading by others during the locked phase), and obtains, in step 313, a global time T3 which is the locking time and will be used in the example as a publishing time. Then the transaction manager unit checks, in step 314, whether or not the working copies of the selected one or more objects are out of date. In this example, this is performed by obtaining from the data repository a global reference time Tn2 of the latest publication for each object n included in the data item A. If there is one publication time Tn2 that is newer than the newest update retrieval time T_ret, or if no publications newer than T0 have been retrieved, one or more of the working copies of the selected objects may be out of date, and the transaction manager unit retrieves, in step 315, a working copy of publications made after the newest T_ret (or after T0, if that is used in step 314), and extracts modifications relating to the selected objects in the data item A currently edited. Each time a published modification of a non-selected object in the data item A is discarded, the transaction manager unit stores, in step 316, at least temporarily a corresponding time T2n. If there are modifications left after extraction (step 317), the transaction manager sends, in step 318, the modifications to the editing unit to be checked for possible conflicting parameters, receives the result, in step 319, and forms (finalizes), in step 320, deviation data fields by associating T3, which is the global time of locking the memory, with each stored time Tn1 and with each stored time Tn2, and then publishes, in step 320, the modified data item A in an atomic transaction, for example, with the global reference time T3 and deviation data fields having the time T3 associated with each time Tn1, Tn2, and after publishing, unlocks, in step 320, the shared memory. By storing the deviation data fields, modifications that were discarded and not updated to the published data item A but have an older global reference time will be detected later and are visible to all users.

If all modifications are discarded in the extraction (step 316), or the working copy is detected to be up to date (step 314), the process proceeds to step 320 to form the dualistic sequence information and to publish the data.

If an update all is received (step 321), the transaction manager unit performs, in step 322, an update according to what is disclosed in FIG. 4, and then returns to monitoring in step 303.

If no update, publish or update all is received, the transaction unit continues monitoring.

FIG. 4 illustrates the functionality of the transaction manager unit, in step 322 in FIG. 3, i.e. when the user wishes to update all objects in the data item A. Hence, the transmission manager unit receives, in step 401, an update all request. Then the transaction manager unit retrieves, in step 402, by means of stored Tn1(s) and the latest T_ret, a working copy of intermediate publications discarded during an update step 307 and intermediate publications not yet retrieved (i.e. publications made into the shared memory after the last retrieval/update), with their deviation data fields, if any, according to their global sequence, and the corresponding global sequence references, and extracts, in step 402, from the retrieved publications modifications relating to the objects in the data item A. If there are no modifications (step 403) to the objects included in the data item A, the transaction manager unit determines that all objects are already up to date and no update is required (step 404), and returns back to FIG. 3 to continue monitoring.

If there are modifications that need to be taken into account at least in one object (step 403), the transaction manager unit adapts locally, in step 405, the sequence according to the global sequence to be an internal sequence of modifications to objects by taking into account the deviation data field(s) (the one(s) retrieved in step 406, or those obtained in earlier refreshments of data) and Tn1(s). Further, the stored Tn1(s) are deleted since during this step they are taken into account and no deviation information is needed afterwards.

So, in the illustrated embodiment, if the first working copy of the data item A is "a", published not sequentially overlapping modifications to the data item A by other users are "b" and "c" while modifying the working copy a of the data item A offline, for example, and the published modification of the working copy is "d", the global sequence in the data repository is "a", "b", "c", "d" but for the published modification "d" the proper sequence of other modifications, i.e. "b" and "c" is different. If there were no updates (i.e. no steps 304 to 309 were performed), the internal sequence is "a", "d", "b", "c". If an update is carried out after "b" has been published but "c" not yet, for example, the internal sequence is "a", some of "d" (i.e. those performed before the update), "b", the rest of "d", "c". When "d" is stored with dualistic sequence information, the above local deviation is unambiguous and findable by others.

Below another example is illustrated. In the example, the data may be in a causal relationship. The principle of causality is the relationship between a cause and an effect, where the effect is a consequence of the cause and happens after the cause. In other words, herein a cause refers to an object in a shared data, a modification of which may affect another object in the shared data, and an effect refers to an object in the shared data that is affected by a modification of another object it is related to, i.e. has a relationship with. In the shared data, stored in a data repository, the definition of a cause contains no reference to another object whereas the definition of an effect contains a reference to another object, and they are separated from each other on the basis of whether or not a reference to another object exists within the object definitions. It should be appreciated that an effect may have a relationship with one or more causes, a modification of a cause may affect one or more effects, and that an effect may be a cause to another effect (for example, there may be cause-effect chains).

Figure 6:
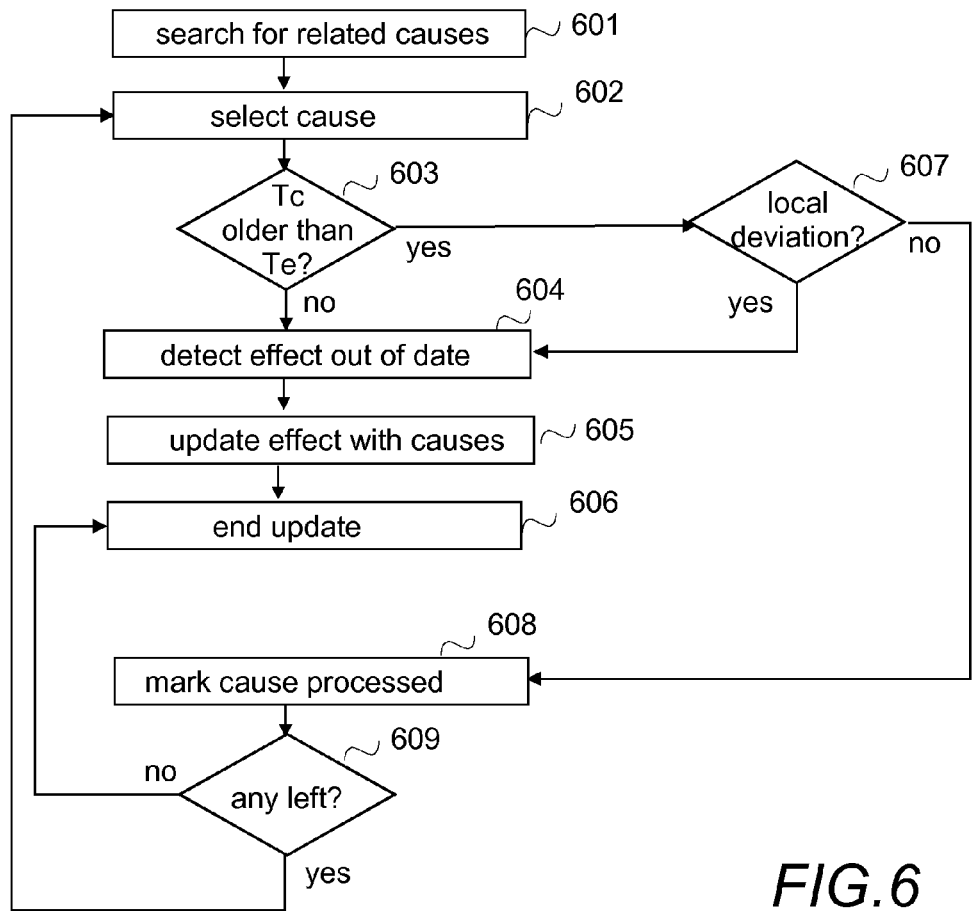
Figure 5:
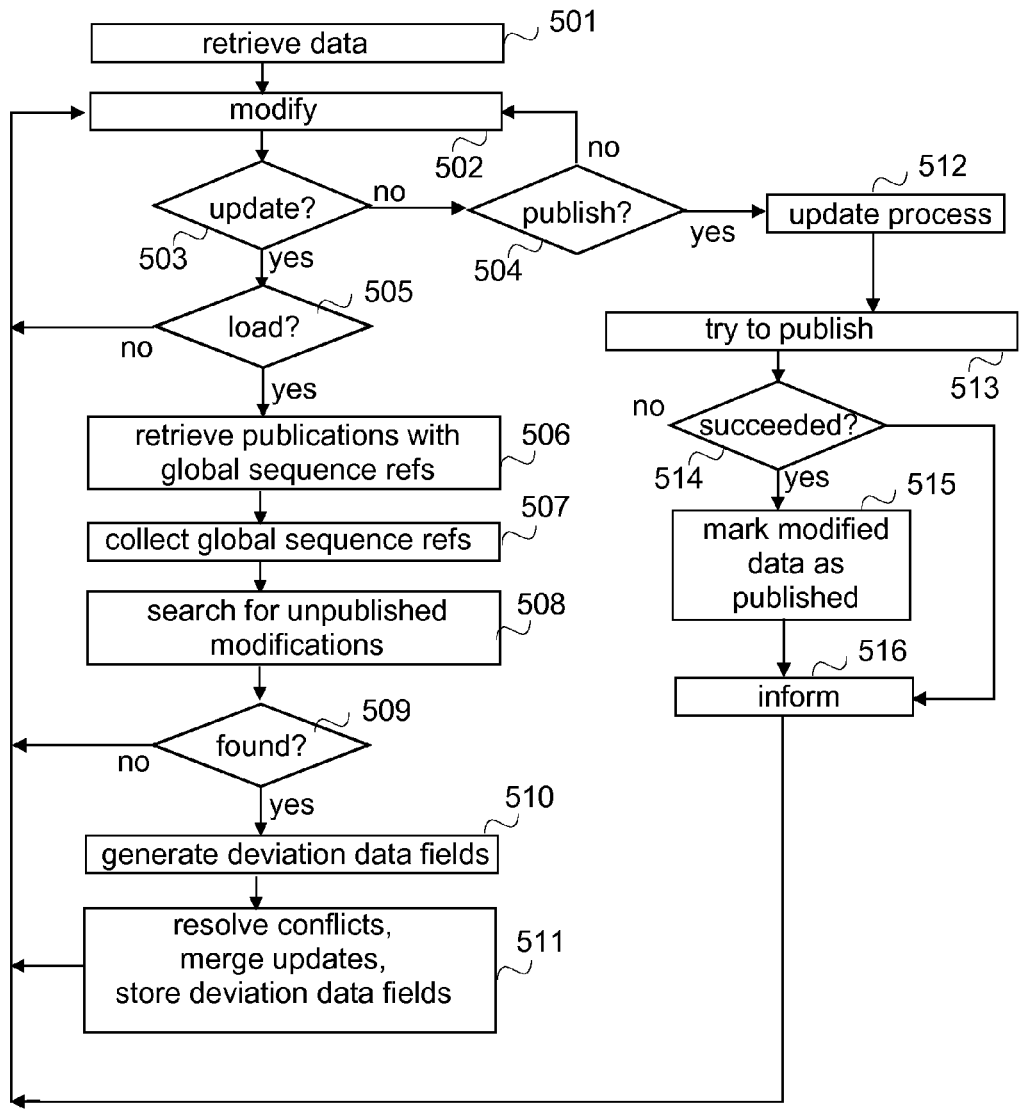

FIG. 5 illustrates an example of how deviation data fields are created and FIG. 6 illustrates an example of how deviation data fields are used when a building information model (i.e. shared data) stored in a shared data repository is modified. In the examples, the functionality of the editing unit and the transaction unit is integrated into one building modeling unit. Further, in this embodiment, modifications to causes are published without propagating the modifications to effects (i.e. without performing an effect update because a related cause was modified).

FIG. 5 starts when a user wishes to modify the data, and therefore the client retrieves, in step 501, all data of the model. It should be appreciated that in another embodiment only data relating to objects the user has selected is obtained. Then the user modifies, in step 502, the data, until the data is updated (step 503) or published (step 504). However, as with the above example, for the sake of clarity, the internal functions relating to the modification locally and including tracking, storing locally, and performing conflict handling are not discussed herein.

In the example it is assumed that the user receives automatic updates and has a real-time connection to the data repository, and that the client is configured to monitor published modifications to the data, and when a published modification, in this example called an update, is detected (step 503), the user is prompted on the update and requested whether or not the update(s) (step 505) is to be loaded. If the updates are not to be loaded yet, the user continues the modification in step 502. In other words, in the example the user receives notifications on intermediate publications, and the user may select whether or not to retrieve the publication immediately or at a later stage. It should be appreciated that in another example, the updates may be automatic updates retrieved without the user's approval, or that intermediate publications are looked for only if the user explicitly selects "update" triggering retrieval of the intermediate publications, in which case the "publish" may include triggering the update to maintain data integrity. The way of updating may also depend on whether or not the user has an online connection; i.e. the client is configured to switch to a "publication monitor" state in response to an existing online connection, and to a "retrieve publications in response to the user command, and establish required online connection at least for as long as the loading of publications take" state in response to no existing online connection. Further, it should be appreciated that if the computing apparatus is turned off in a monitoring mode, the transaction manager continues the monitoring when the computing apparatus is again turned on.

If the user accepts loading (retrieving) the publication(s) (step 505), the publications (including the publication triggering prompting the user and those delayed until now) with their global sequence reference(s) are retrieved, in step 506, from the data repository, and the generation of deviation data fields starts. First, global sequence references from the publications are collected in step 507. Then all those internal sequences that will globally be newer than the publications, i.e. modifications not marked as published and therefore to be published later, will be searched for in step 508. In other words, "own" modifications performed after a previous "own publication" are searched for, and if found (step 509), deviation data fields are generated, in step 510, for all found internal sequences. It should be appreciated that herein "own" means any modification performed on the local working copy, regardless of the one performing the modification, excluding only modifications received by means of retrieving publications from the shared memory whereto modifications are published. These dualistic data fields are stored, in step 511, as part of the modification information, conflicts are resolved, in step 511, and publications merged, in step 511, and the process continues in the modification step 502 until one or more new publications are detected or the user wishes to publish modifications. If no globally newer modifications are found (step 509), the process continues in the modification step 502 until one or more new modifications are detected or the user wishes to publish modifications.

In the illustrated example, the publish procedure is implemented as a "try to succeed" which means that publishing will succeed if no one is publishing when the attempt to publish is made, i.e. publishing is performed without locking the data retrieval system. Therefore, when the user wishes to publish, the above-described update procedure (i.e. steps corresponding to steps 506 to 511 but ending at step 513) is triggered, in step 512. Then the client tries, in step 513, to publish the data or modifications to the data, associated with a global sequence reference as an atomic transaction, for example, with corresponding deviation data fields. If the publishing succeeded (step 514), the modifications are marked, in step 515, as published ones, the user is informed, in step 516, that the publishing succeeded, and the process continues by modifying the data in step 502. If the publishing failed (step 514), the user is informed, in step 516, correspondingly that the publishing failed, and the process continues by modifying the data in step 502.

It should be appreciated that instead of the try to succeed mechanism the above-described locking mechanism may be used, in which case step 512 is preferably performed after locking.

As said above, it should be appreciated that should the user work offline, the updates (publications) may be detected only when the user again has an online connection to the data repository. In a further implementation, the updates (publications) may be checked only in response to a specific user command to retrieve updates (publications), or as a part of publish operation, in which case there is no need to prompt the user on the updates (publications).

FIG. 6 illustrates how the dualistic data fields are used when an effect is taken to be processed, for example the user wishes to preview a drawing, or print it, or a connection is edited or viewed. FIG. 6 starts when data is to be updated (updating in connection with FIG. 6 meaning that intermediate modifications of one or more causes are propagated to an effect) and all related information, including the associated dualistic data fields, if such exist(s), are in the client. Therefore, the related causes are searched for, in step 601, and one of the causes, for example the newest one, is selected in step 602. It is then compared, in step 603, whether the global sequence reference Tc of the selected cause is older than the global sequence reference Te of the effect. If not, the selected cause is newer, and it is detected, in step 604, that the effect is out of date. Then the effect is updated, in step 605, by modification history of each related cause, and then the updating of the effect ends, in step 606.

If the global sequence reference Tc of the selected cause is older than the global sequence reference Te of the effect (step 603), it is checked, in step 607, whether there are deviation data fields indicating a local deviation from the global sequence. If there is a deviation data field associating the global sequence reference Tc with the global sequence reference Te, all published modifications of the cause have not yet been updated to the effect, and the process continues from step 604, where it is detected that the effect is out of date to step 605 to update the effect.

If no deviation data field indicates a local deviation from the global sequence, the effect is up to date in respect of the cause in question, and the cause is marked, in step 608, as a processed one in the related causes. Then the client checks, in step 609, whether there are non-processed related causes. If yes, the process continues in step 602 to select one from non-processed related causes.

If there are no non-processed related causes (step 609), the updating of the effect ends (step 606).

For example, if Tc=3 and Te=5, but there is no deviation data fields, the cause is globally older and the effect is up to date. If Tc=6 and Te=5, the cause is globally newer and the effect is out of date, and this can be found out merely by means of the global sequence references. If Tc=3 and Te=15, and there is a deviation data field [T3]:[T15], the cause is globally older but the effect is out of date because there is a local deviation from the global sequence, and the effect needs to be updated.

In one embodiment, instead of updating the effect in step 605, the effect is associated with information indicating that the effect is out of date. (This process may be called as finding out out of date effects.) The information on out of date may then be used to visualize to a user those parts/points/places which are out of date when the user views the model, for example, and if the user clicks, for example, an effect visualized as one being out of date, the effect is updated as described above (i.e. at least steps 601 to 603 and 605 to 608 shown in FIG. 6 are then performed, and information on out of date is deleted). Depending on implementation, finding out out of date effects may be performed as a background process each time a publication is retrieved, or in response to a predetermined action by the user, like zooming out.

To save memory, global sequence reference groups may be used such that each global sequence reference group has one unambiguous global sequence reference which may be used for all modifications belonging to the group. In a solution, within the group, each modification is associated with an increment/offset to the global sequence reference, the increment/offset being unambiguous within the group and indicating a local order, in which case the steps described in connection with FIG. 6 may be performed by using a combination of the global sequence reference and a corresponding offset/increment as a global sequence reference. By implementing such a solution, the objects in such a global sequence reference group will always have different global sequence references for the above described purposes. Alternatively, if the offsets/increments are implemented, they may be used only if an exact local order is needed. In an implementation in which a cause and an effect may have the same global sequence reference, if there is a cause that is as old as the effect (i.e. Tc=Te in step 603), an internal storing order may be used to determine whether to continue to step 604 or to step 607, or the process may directly proceed to step 607.

It should be appreciated that when all cause-effect pairs relating to a specific deviation data field have been processed/updated, the specific deviation data field may be deleted.

As can be seen from the above, the implementation described with FIGS. 5 and 6 provides the advantage that unnecessary updates of effects are avoided but when an update is made to the effect, all previous modifications to cause(s) that are not yet updated to the effect are taken into account. Thus, processing/updating capacity can be saved by the delayed updating and yet data integrity can be maintained. This is especially advantageous with parametric modeling which uses parameters to define a model that may comprise parts consisting of multiple features, assemblies consisting of two or more parts and drawings that can be made from parts or assemblies. Typically in a parametric model there exists a relationship between parts, assemblies and drawings. In the parametric modeling a parameter may be modified later, and the model will update to reflect the modification, i.e. the modification is propagated within the model to each part/assembly/drawing the modification (or a further modification caused by the modification) affects. By means of the deviation information this updating (propagation) can be delayed to a point at which the propagation is more convenient or the up to date version of a part needed. Examples of parametric modeling with which the delayed updating by means of deviation information may be implemented include modeling applications in construction, energy and infrastructure industries. However, as said above, different embodiments may be implemented with any application supporting use of shared data, they are not restricted to parametric applications.

A further advantage provided by the delayed updating is that it is possible to delay the retrieval of others' publications and/or delay publishing of "own" modifications without worrying about data integrity.

Further, by means of the causality and the possibility to delay updating provided by the above embodiment, a delayed concurrency/conflict management is provided for optimistic concurrency control mechanisms in database management systems, the delayed concurrency/conflict management enabling conflict resolution to be postponed from synchronizing situation to a later stage, where the conflict needs to be resolved.

Figure 7:
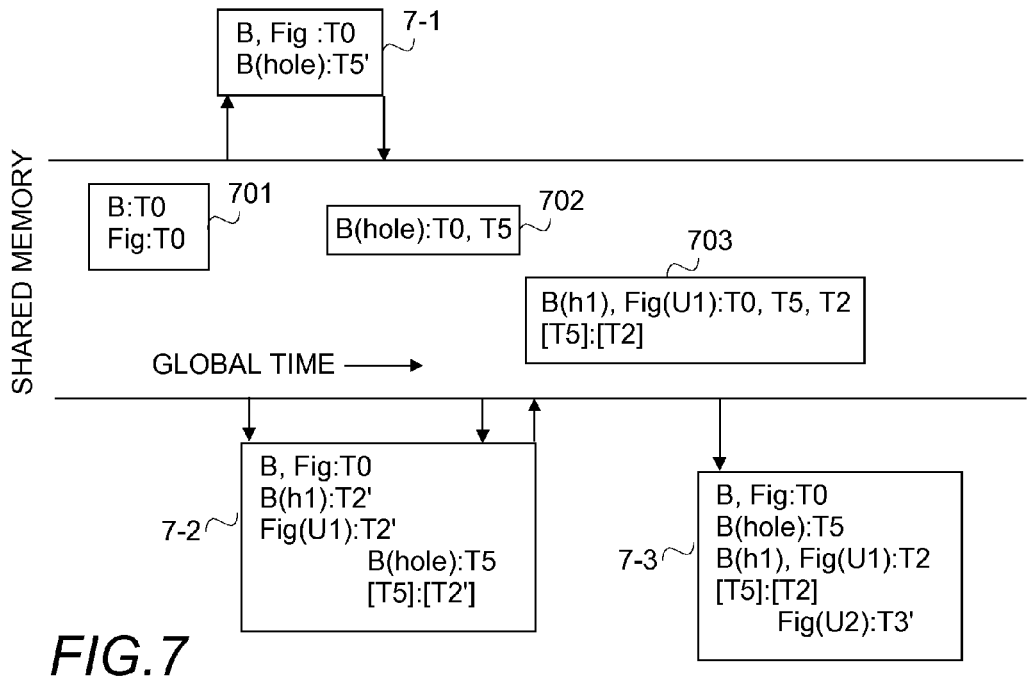
FIGS. 7 and 8 are schematic charts illustrating different examples.

A further example is illustrated in FIG. 7. The example relates to building information modeling (BIM) and to an implementation wherein the causality principle is used and, thanks to the use of dualistic sequence information, it is possible to store in the shared data (shared memory) only modifications/updates performed on the data. By only storing modifications/updates, the time the shared data is locked or unavailable to other users can be shorten since the amount of published data is minimized. BIM is a digital representation of the building process to facilitate exchange and interoperability of information in digital format. Examples of causes in a building information modeling include beams, columns, plates, while examples of effects include connections, such as connections between beams and columns, or connections between beams and plates, drawings, a list of elements needed for a building, etc. More precisely, a connection updates itself if a beam it connects to is changed; and since a drawing depends on the parts shown in the drawing, changing or deleting a part is the cause and a change in the drawing contents is the effect.

The example illustrated in FIG. 7 is an example illustrating the principles with a very small model piece, although in the real-world models the amount of data, and dualistic sequence information, is usually much greater. In the example it is assumed that a building is modeled to shared data stored in a shared memory, the data and the memory being shared by an architect, a plumbing engineer, and a prefabrication factory, each using modeling application of their own, preferably configured to store the data in a data type called IFC (Industry Foundation Classes). IFC is a data representation standard and file format to facilitate interoperability of different data created in the building industry. However, it should be appreciated that the file format(s) of the data used bear(s) no significance and means other than the common storage format to obtain data exchange between different applications may be used, if necessary. Further, all users may use the same software product/application, such as Tekla Structures or Tekla Solutions.

Figure 8:
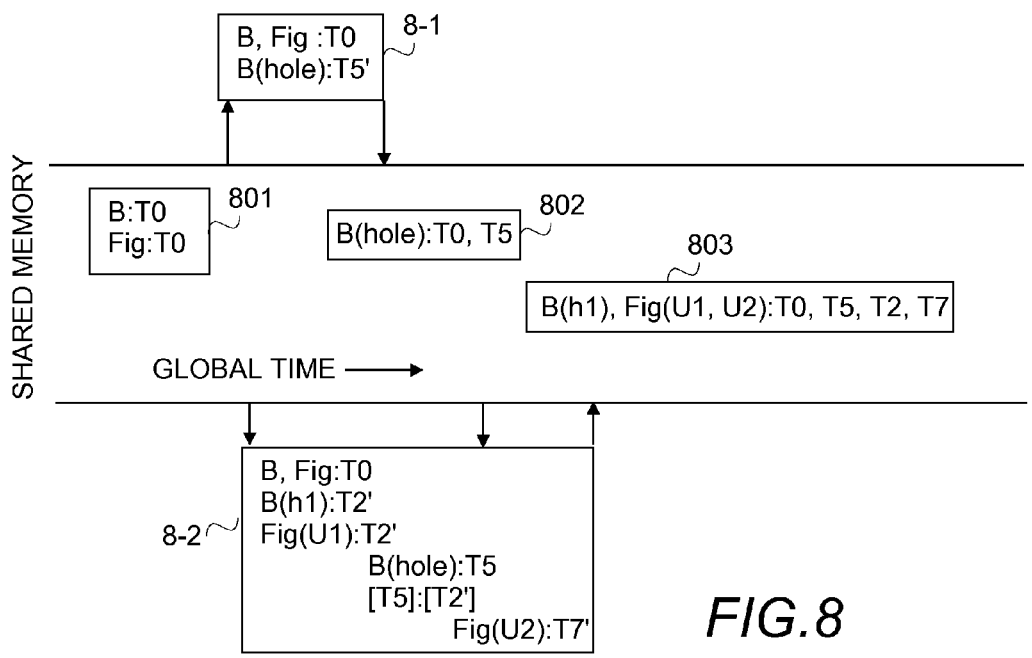
Figure 9:
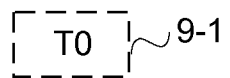
FIG. 9 illustrates one way to maintain a global sequence.
Figure 9:
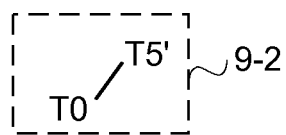
Figure 9:
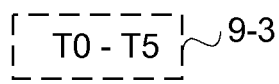
Figure 9:
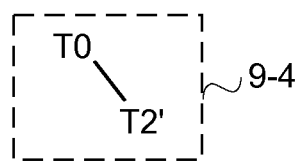
Figure 9:
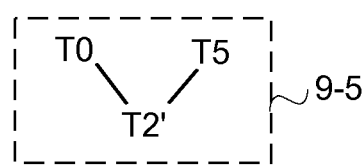
Figure 9:
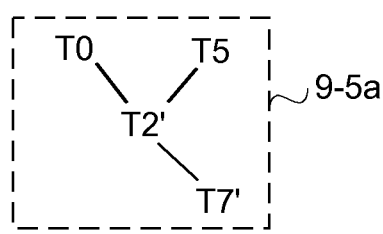
Figure 9:
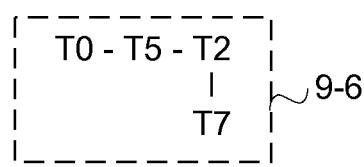

In the example, the dualistic sequence is saved as part of a corresponding data item, and the dualistic sequence comprises all previous global sequence references and local deviations from the global sequence. In other words, using the same example as that used in connection with FIG. 1, the following information is in the shared data (shared memory): data item 1 comprising global sequence [T1 . . . T7] and no local deviation, data item 2 comprising global sequence [T1 . . . T7], [T8 . . . T25] and a local deviation [T1 . . . T7]: [T8 . . . T17] and data item 3 comprising global sequence [T1 . . . T7], [T8 . . . T25], [T26 . . . T30] and local deviations [T1 . . . T7]:[T8 . . . T17], [T8 . . . T25]:[T26 . . . T28], etc. Although the global sequence references in the previous example are consecutive in number, and thereby easily seen as defining an unambiguous sequence, by means of storing all previous global sequence references in the order the corresponding data items were published, and the current global sequence reference as the last one, the global sequence remains unambiguous regardless of whether or not the global sequence references are consecutive. This is illustrated in FIGS. 7, 8, and 9.

Further, in the example illustrated in FIG. 7, it is assumed that when a modeling application retrieves data from the shared data (shared memory), a new sequence reference is automatically obtained.

Referring to FIG. 7, a model 701, when first time published into the shared data, comprises two objects: a beam B and a drawing of a beam (Fig) and a sequence reference T0. Let us assume a situation in which the architect has retrieved a working copy of the model to his own computer and obtained a sequence reference T2' while the plumbing engineer has retrieved another working copy of the model to his own computer and obtained a sequence reference T5'. (In the example a sequence reference with an apostrophe denotes a not-yet-published sequence reference).

At the time of both retrievals, the contents of the working copies are the same (B and Fig), since no updates/modifications have been published after the model 701 was published. Both the architect and the plumbing engineer edit the model in their own computers. While the architect amends (point 7-2) the height of the beam (B(h1) with sequence reference T2') and then updates the drawing to correspond the new height Fig (U1) with T2'), the plumbing engineer has added (point 7-1) a hole to the beam (B(hole)) with the sequence reference T5'. Then the plumbing engineer publishes the modification with global sequence information T0, T5. As can be seen, the global sequence information stores the publishing order unambiguously, and the last sequence reference in the information is the sequence reference of the published data item. In the example, only modifications 702 are published, i.e. (B(hole)) means the addition of hole to the beam. Then modifications 702 are retrieved to the architect's computer and since it is a published modification of another user, retrieved while there are unpublished "own" modifications, a local deviation [T5]:[T2'] is created. Since the modifications do not conflict with those performed by the architect, no conflict resolution (meaning parameter values in conflict with each other are resolved) is performed. The architect has viewed his amendment, is satisfied with it, has no motivation to modify the hole, and publishes his modification 703 with the sequence reference T2, this modification including information that the height was amended and the drawing was updated, the information being given as (B(h1) and Fig(U1), associated with the global sequence information T0, T5, T2 and a deviation data field [T5]:[T2].

After a while, the prefabrication factory wishes to have the drawing to prepare a mold for the beam, and therefore retrieves a working copy of the model, i.e. data in 701, 702 and 703, in point 7-3, obtains a sequence reference T3', and gives a "print drawing" command. The updating of the drawing begins, in point 7-3, preferably so that the architect's height modification is not updated to the drawing again. However, in any case at least the plumbing engineer's modification is updated to the drawing, thanks to the local deviation in the dualistic sequence information indicating that the plumbing engineer's modification (702) is newer for this architect's modification (703) although it is globally older. Thereby, the hole will also be in the drawing. Without the dualistic sequence information, data integrity is obtainable only if the drawing is updated each time a modification to the beam is published. In more complex cases, system resources would be used in vain since the updated drawing is required only after several amendments. If the drawing is updated only when needed and no dualistic sequence information, or no local deviation from the global sequence, nor any corresponding information, is created and stored in the shared data, the hole would be missing from the drawing since, according to the global sequence in the shared data, the architect's modification is newer than the plumbing engineer's modification and indicates that the drawing was updated, although locally, in the architect's computer, the plumbing engineer's modification is newer, and thus the hole is not updated locally to the drawing. In other words, with the dualistic sequence information, it is possible to delay updating to the point at which the update is needed, and store mere delta information (by means of delta encoding) in the shared data, and still to maintain the data integrity.

FIG. 8 illustrates another example that begins as in FIG. 7, and therefore the beginning is not repeated. The detailed description continues from the point at which the plumping engineer's modifications 802 are retrieved to the architect's computer. Since it is a published modification of another user retrieved while there are unpublished "own" modifications, a local deviation [T5]:[T2'] is created. Further, because of the retrieval, a new sequence reference T7' is obtained. Since the modifications do not conflict with those performed by the architect, no conflict resolution (meaning parameter values in conflict with each other being resolved) is performed.

This time the architect leaves the office and decides to update the whole model during the absence. During the update, thanks to the local deviation indicating that the plumbing engineer's modification (802) is newer for the non-published drawing update performed by the architect although it is globally older (the global sequence is already T0-T5, so T2 will unambiguously be globally newer), the plumbing engineer's modification is updated to the drawing. Thereby, the hole will also be in the drawing. Without the deviation information the update should have been performed when the plumbing engineer's modification (802) was retrieved. Further, since the retrieved modification that created the local deviation is propagated to the model, the local deviation may be deleted.

The architect then comes back and publishes his modification 803 with the sequence references T2 and T7, this modification including information that the height was amended and the drawing was updated, the information being given as (B(h1) and Fig(U1, U2), associated with global sequence information T0, T5, T2, T7. However, since the retrieved modification 802 was propagated to the model in point 8-2, no deviation data field is published in 803.

In another implementation, the command "publish" and/or shutting down the application using the working copy may trigger updating of all data items so that the shared data contains no deviation data fields.

It should be appreciated that the delayed updating by means of deviation information may also be performed as a background process when there are resources available, i.e. without slowing down the current modifications process, so that when a user starts to modify an effect object, for example, it may already be updated and the user can start modification without waiting for the update process to be finished.

As is evident from the above, one advantage provided by the dualistic sequence information is that a user can modify the contents of shared data locally without online/real-time connection, and yet the data integrity is maintained.

There are several ways how to store and maintain a global unambiguous sequence and local deviations. FIG. 9 illustrates an example of a tree structure that may be used for the global sequence references and local deviations with the example of FIG. 7. Point 9-1 is the point at which the model is created. Point 9-2 illustrates the tree structure within the plumbing engineer's computer, and point 9-3 the tree structure in the shared data at the plumbing engineers publication. Point 9-4 illustrates the tree structure within the architect's computer after the architecture's own modifications, point 9-5 the tree structure when the plumbing engineer's published modification is retrieved. (As can be seen, in the illustrated example, the published (i.e. global) sequence references are at the same level.) Point 9-5a illustrates how the tree structure within the architect's computer look when the plumbing engineer's published modifications were retrieved and a new sequence reference T7' was obtained. Point 9-6 describes the tree structure after the architect's publishing, the local deviation being indicated by the branch to the global sequence line. In the illustrated implementation, since the architect made no further modifications, the sequence reference T7' is not published. It should be appreciated that in another implementation T7 may be published as well.

In a further implementation, a new sequence reference, including the first sequence reference, is obtained when modification starts after data has been retrieved from the shared memory. In the implementation no T7' is obtained.

Yet another example of how to store and maintain a global unambiguous sequence and local deviations is to store them so that if a sequence reference is stored more than once, the first one indicates the proper sequence while the later ones indicate that the sequence before may have an internal sequence deviating from the global sequence. Using the modifications in the drawing of the beam (Fig) in the example of FIG. 7, the dualistic sequence in the modification 703 would be T0, T5, T2, T5.

The steps, points and information exchange shown in FIGS. 3 to 8 are in no absolute chronological order, and some of the steps/points may be performed simultaneously or in an order different from the given one. For example, effects may be updated concurrently and/or as a background operation while the user continues other modifications and/or the effects may be updated in response to a specific request (for example, during weekend when the processing load is low). Other functions can also be executed between the steps/points or within the steps/points. Some of the steps/points or part of the steps/points can also be left out. The steps/points can also be freely combined or divided into several parts.

As is evident from the above description, it bears no significance how and what data is retrieved for the modification.

Although in the above the modifications are published, it should be appreciated that the user may indicate modification by modification, for example, whether or not the modification is a modification the user wishes to publish to the shared data, and only those are published that are indicated to be the published ones.

Although in the above it is assumed that the client takes care of the publishing of the unambiguous sequence reference, it should be appreciated that the memory system whereto the publications is made may be configured to generate the unambiguous sequence reference and associate it with the publication.

Although in the above the embodiments have been described using a logical memory structure in which there is a local memory and a global/shared memory into which the publishing is performed and wherefrom working copies are retrieved to the local memory, it should be appreciated that the embodiments may be implemented into a logical memory structure allowing one or more memories to be so called "double actor memories", i.e. allowing a memory to be both a global memory and a local memory. In a "double actor memory" the shared data (shared as the global memory) and publications (including the deviation information) into the shared data may be considered as "own" modifications to the working copy (maintained as the local memory). Further, in the "double actor memory", a data item may be visible only to those using the "double actor memory" as a shared memory, or a data item may be only in the working copy but not visible to those using the "double actor memory" as a shared memory, or a data item may be both in the working copy and visible to those using the "double actor memory" as a shared memory.

Let us consider an example: Persons are working for a company A and publish modifications N to project data into the company's A internal memory which then stores the published data with corresponding dualistic sequence information in an unambiguous sequence (that is the global sequence within the company's A internal memory). Then a project manager for the company A decides to publish some or all of the project data, including the published data with the corresponding dualistic sequence information, into a subcontractor's data repository. Now the project data in the company's A internal memory is treated as a local working copy (including the modifications N as "own" modifications) and further dualistic sequence information may be generated, if the subcontractor's data repository contains intermediate publications. The subcontractor's data repository stores the data published with corresponding dualistic sequence information in an unambiguous sequence that is the global sequence within the subcontractor's data repository, and the internal sequence is the sequence in the company's A internal memory, which may comprise deviation information. The same approach is implemented if data in the subcontractor's data repository is published into a main contractor's data repository, etc. As can be seen from the above example, delayed updating of shared data is obtainable at several phases.

It should be appreciated that the above embodiments are implementable in situations in which application instances used simultaneously by the same user, for example, process shared data when the data in the process is considered as a local working copy, and the result as a publication of the shared data. For example, a first instance calculates something from one or more of values and during that the other instance modifies the values, which, in the end results in that the calculations need to be performed again. When the values are considered as shared data, and the values the calculation process uses during calculating, as a local working copy, the dualistic information is created when the result of the calculation is stored, and thereby the calculation process will be triggered, at the latest when the result of the calculation is needed. This also facilitates the usage of background processes: while they are running, modification may continue and the data integrity is maintained.

It will be obvious to a person skilled in the art that as technology advances, the inventive concept can be implemented in various ways. The invention and its embodiments are not limited to the examples described above but may vary within the scope of the claims.

The invention claimed is:

1. A method, comprising:
retrieving, by a computing apparatus, a working copy comprising one or more data items of shared data from a shared memory in which modifications or updates to the shared data are stored as publications in an unambiguous sequence,
the modifications or updates stored in the shared data being associated with dualistic sequence information comprising unambiguous sequence references;
detecting, by the computing apparatus, a publication that is performed after the retrieval of the working copy;
generating, by the computing apparatus, in response to the detecting, deviation information indicating that there may be a local deviation from the unambiguous sequence;

checking, by the computing apparatus, in response to updating a data item in the retrieved working copy, whether deviation information is provided indicating that there may be a local deviation from the unambiguous sequence; and if said deviation information is provided, using, by the computing apparatus, a deviated sequence when performing the update, otherwise using the unambiguous sequence.

2. The method as claimed in claim 1, further comprising:
publishing, by the computing apparatus, at least modifications made to the working copy with the deviation information and a corresponding unambiguous sequence reference to the shared memory, the unambiguous sequence reference and the deviation information forming dualistic sequence information.

3. The method as claimed in claim 2, wherein each data item comprises, in addition to the actual data contents, an unambiguous sequence reference of the data item and unambiguous sequence references of earlier published data items, and deviation information on the data item and deviation information on earlier published data items.

4. The method as claimed in claim 1, wherein each data item comprises, in addition to the actual data contents, an unambiguous sequence reference of the data item and unambiguous sequence references of earlier published data items, and deviation information on the data item and deviation information on earlier published data items.

5. The method as claimed in claim 1, wherein the shared data is for building information modelling.

6. A method, comprising:
retrieving, by a computing apparatus, a working copy comprising one or more data items of shared data from a shared memory in which modifications or updates to the shared data are stored as publications in an unambiguous sequence;

detecting, by the computing apparatus, a publication that is performed after the retrieval of the working copy;

generating, by the computing apparatus, in response to the detecting, deviation information indicating that there may be a local deviation from the unambiguous sequence; and updating, by the computing apparatus, the data item if the data item comprises an effect object, the effect object being an object that is affected by a modification of a related object, the related object being another object with which the effect object has a relationship, wherein the updating of the effect object comprises:

retrieving all related objects of the effect object, comparing unambiguous sequence references of the related objects with the unambiguous sequence reference of the effect object, and updating the effect object with all related objects by using the unambiguous sequence if there is a related object having a newer unambiguous sequence reference than the unambiguous sequence reference of the effect object, or updating the effect object with all related objects by using a deviated sequence if there is a related object that, according to the unambiguous sequence, is older than the effect object and there is deviation information comprising the unambiguous sequence references of both the related object and the effect object, the unambiguous sequence references being associated with each other in the deviation information so that they indicate a local deviation from the unambiguous sequence, otherwise detecting that no updating is required.

7. The method as claimed in claim 6, further comprising:
publishing, by the computing apparatus, at least modifications made to the working copy with the deviation information and a corresponding unambiguous sequence reference to the shared memory, the unambiguous sequence reference and the deviation information forming dualistic sequence information.

8. The method as claimed in claim 7, wherein each data item comprises, in addition to the actual data contents, an unambiguous sequence reference of the data item and unambiguous sequence references of earlier published data items, and deviation information on the data item and deviation information on earlier published data items.

9. The method as claimed in claim 6, wherein the shared data is for building information modelling.

10. A method, comprising:
retrieving, by a computing apparatus, a working copy comprising one or more data items of shared data from a shared memory in which modifications or updates to the shared data are stored as publications in an unambiguous sequence and are associated with dualistic sequence information comprising unambiguous sequence references;

checking, by the computing apparatus, in response to updating a data item in the retrieved working copy, whether deviation information is provided indicating that there may be a local deviation from the unambiguous sequence; and if said deviation information is provided, using, by the computing apparatus, a deviated sequence when performing the update, and otherwise using the unambiguous sequence.

11. The method as claimed in claim 10, further comprising:
updating, by the computing apparatus, the data item if the data item comprises an effect object, the effect object being an object that is affected by a modification of a related object, the related object being another object with which the effect object has a relationship, wherein the updating of the effect object comprises:
retrieving all related objects of the effect object, comparing unambiguous sequence references of the related objects with the unambiguous sequence reference of the effect object, and updating the effect object with all related objects by using the unambiguous sequence if there is a related object having a newer unambiguous sequence reference than the unambiguous sequence reference of the effect object, or updating the effect object with all related objects by using a deviated sequence if there is a related object that, according to the unambiguous sequence, is older than the effect object and there is deviation information comprising the unambiguous sequence references of both the related object and the effect object, the unambiguous sequence references being associated with each other in the deviation information so that they indicate a local deviation from the unambiguous sequence, otherwise detecting that no updating is required.

12. The method as claimed in claim 10, wherein each data item comprises, in addition to the actual data contents, an unambiguous sequence reference of the data item and unambiguous sequence references of earlier published data items, and deviation information on the data item and deviation information on earlier published data items.

13. The method as claimed in claim 10, wherein the shared data is for building information modelling.

14. An apparatus comprising:
    at least one processor; and
    at least one memory including computer program code, the at least one memory and the computer program code being configured to, with the at least one processor, cause the apparatus at least to
        retrieve, from a shared memory, a working copy comprising one or more data items of shared data, wherein modifications or updates to the shared data are stored in the shared memory as publications in an unambiguous sequence,
        detect a publication that is performed after the retrieval of the working copy, and
        generate, in response to the detect, deviation information indicating that there may be a local deviation from the unambiguous sequence,
    wherein the at least one memory and the computer program code are configured to, with the at least one processor, further cause the apparatus at least to:
        update the data item if the data item comprises an effect object, the effect object being an object that is affected by a modification of a related object, the related object being another object with which the effect object has a relationship, and
    wherein the update of the effect object comprises:
        retrieving all related objects of the effect object,
        comparing unambiguous sequence references of the related objects with the unambiguous sequence reference of the effect object, and
        updating the effect object with all related objects by using the un-ambiguous sequence if there is a related object having a newer unambiguous sequence reference than the unambiguous sequence reference of the effect object, or
        updating the effect object with all related objects by using a deviated sequence if there is a related object that, according to the unambiguous sequence, is older than the effect object and there is deviation information comprising the unambiguous sequence references of both the related object and the effect object, the unambiguous sequence references being associated with each other in the deviation information so that they indicate a local deviation from the unambiguous sequence,
        otherwise detecting that no updating is required.

15. The apparatus as claimed in claim 14, wherein the at least one memory and the computer program code are configured to, with the at least one processor, further cause the apparatus at least to publish at least modifications made to the working copy with the deviation information and a corresponding unambiguous sequence reference to the shared memory, the unambiguous sequence reference and the deviation information forming dualistic sequence information.

16. A non-transitory computer-readable program storage medium with a computer program for data processing, wherein the execution of the program on a computer makes the computer implement the following steps:
    retrieving a working copy comprising one or more data items of shared data from a shared memory in which modifications or updates to the shared data are stored as publications in an unambiguous sequence and are associated with dualistic sequence information comprising unambiguous sequence references;
    checking, in response to updating a data item in the retrieved working copy, whether deviation information is provided indicating that there may be a local deviation from the unambiguous sequence; and
    if said deviation information is provided, using a deviated sequence when performing the update,
    otherwise using the unambiguous sequence.

17. The non-transitory computer-readable program storage medium as claimed in claim 16, wherein the execution of the program on a computer makes the computer further implement the following:
    updating the data item if the data item comprises an effect object, the effect object being an object that is affected by a modification of a related object, the related object being another object with which the effect object has a relationship, the updating of the effect object comprising:
        retrieving all related objects of the effect object,
        comparing unambiguous sequence references of the related objects with the unambiguous sequence reference of the effect object, and
        updating the effect object with all related objects by using the unambiguous sequence if there is a related object having a newer unambiguous sequence reference than the unambiguous sequence reference of the effect object, or
        updating the effect object with all related objects by using a deviated sequence if there is a related object that, according to the unambiguous sequence, is older than the effect object and there is deviation information comprising the unambiguous sequence references of both the related object and the effect object, the unambiguous sequence references being associated with each other in the deviation information so that they indicate a local deviation from the unambiguous sequence,
        otherwise detecting that no updating is required.

18. A system comprising:
    at least one first apparatus configured to:
        retrieve a working copy comprising one or more data items of shared data from a shared memory in which modifications or updates to the shared data are stored as publications in an unambiguous sequence and are associated with dualistic sequence information comprising unambiguous sequence references,
        check, in response to updating a data item in the retrieved working copy, whether deviation information is provided indicating that there may be a local deviation from the unambiguous sequence, and
        if said deviation information is provided, use a deviated sequence when performing the update, and otherwise use the unambiguous sequence; and
    at least one second apparatus configured to:
        maintain data items in an unambiguous sequence in a shared data, and
        maintain deviation information, the deviation information indicating that there may be a local deviation from the unambiguous sequence.

19. The system as claimed in claim 18,
    wherein the at least one first apparatus is further configured to:
        update the data item if the data item comprises an effect object, the effect object being an object that is affected by a modification of a related object, the related object being another object with which the effect object has a relationship, and wherein the update of the effect object comprises:
retrieving all related objects of the effect object,
comparing unambiguous sequence references of the related objects with the unambiguous sequence reference of the effect object, and
updating the effect object with all related objects by using the unambiguous sequence if there is a related object having a newer unambiguous sequence reference than the unambiguous sequence reference of the effect object, or
updating the effect object with all related objects by using a deviated sequence if there is a related object that, according to the unambiguous sequence, is older than the effect object and there is deviation information comprising the unambiguous sequence references of both the related object and the effect object, the unambiguous sequence references being associated with each other in the deviation information so that they indicate a local deviation from the unambiguous sequence,
otherwise detecting that no updating is required.

20. The system as claimed in claim 18,
wherein the first apparatus is a client apparatus and the second apparatus is a server apparatus, and
wherein an online connection between the client apparatus and the server apparatus is required only for retrieving or publishing data.

* * * * *